(12) United States Patent
Roman et al.

(10) Patent No.: US 12,231,007 B2
(45) Date of Patent: Feb. 18, 2025

(54) SYSTEMS AND METHODS TO MITIGATE ELECTRICAL VOLTAGE ON A ROTATING SHAFT IMMERSED IN OIL

(71) Applicant: Illinois Tool Works Inc., Glenview, IL (US)

(72) Inventors: Matthew Roman, Glenview, IL (US); Richard Nye, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 102 days.

(21) Appl. No.: 17/358,265

(22) Filed: Jun. 25, 2021

(65) Prior Publication Data

US 2022/0006367 A1    Jan. 6, 2022

Related U.S. Application Data

(60) Provisional application No. 63/046,993, filed on Jul. 1, 2020.

(51) Int. Cl.
*H02K 11/40* (2016.01)
*H01R 39/12* (2006.01)
*H01R 39/22* (2006.01)

(52) U.S. Cl.
CPC ............ *H02K 11/40* (2016.01); *H01R 39/12* (2013.01); *H01R 39/22* (2013.01)

(58) Field of Classification Search
CPC ........ H02K 11/40; H01R 39/12; H01R 39/22; H01R 39/56; H01R 39/48; H01R 39/24; H01R 39/20
USPC ........................................................ 361/221
See application file for complete search history.

(56) References Cited

U.S. PATENT DOCUMENTS

| | | | |
|---|---|---|---|
| 4,483,574 A | 11/1984 | Chabrerie | |
| 7,557,485 B1 | 7/2009 | Lynch | |
| 2004/0184215 A1* | 9/2004 | Oh | H05F 3/04 |
| | | | 361/220 |
| 2013/0005158 A1* | 1/2013 | Richardson | H02K 11/40 |
| | | | 439/27 |
| 2019/0081538 A1* | 3/2019 | Nye | H01R 39/025 |
| 2021/0293279 A1* | 9/2021 | Hubert | H02K 11/40 |

FOREIGN PATENT DOCUMENTS

CN        111095690        5/2020

OTHER PUBLICATIONS

Int'l Search Report and Written Opinion Appln No. PCT/US2021/039315 mailed Oct. 7, 2021.
Taiwanese Search Report Appln No. 110124244 dated Nov. 21, 2024.

* cited by examiner

*Primary Examiner* — Thienvu V Tran
*Assistant Examiner* — Sreeya Sreevatsa
(74) *Attorney, Agent, or Firm* — McAndrews, Held & Malloy, Ltd.

(57) ABSTRACT

Systems and methods to mitigate electrical voltage on a rotating shaft in an oil rich environment exposed to a viscous fluid or immersed in oil are disclosed. An example grounding brush assembly includes a plurality of conductive filaments configured to extend through the viscous medium surrounding the rotating shaft to be in electrical contact with the rotating shaft when the brush assembly is disposed proximate the shaft.

20 Claims, 6 Drawing Sheets

SYSTEMS AND METHODS TO MITIGATE ELECTRICAL VOLTAGE ON A ROTATING SHAFT IMMERSED IN OIL

CROSS-REFERENCE TO RELATED APPLICATIONS

This application hereby claims priority to and the benefit of U.S. Provisional Application Ser. No. 63/046,993 entitled "Systems And Methods To Mitigate Electrical Voltage On A Rotating Shaft Immersed In Oil," filed Jul. 1, 2020. The above listed U.S. Application is hereby incorporated by reference in its entirety for all purposes.

BACKGROUND

In applications employing a rotating shaft, such as while a motor is running, a buildup of charge on the motor shaft or downstream equipment conductive elements can lead to electrical discharges through bearings or other motion contact interfaces such as but not limited to gear teeth in downstream equipment resulting in mechanical damage and premature bearing failure or moving contact interface failure. A number of mitigation technologies have been used in attempts to overcome this problem, including conductive brushes making contact with the rotating shaft having a path to ground. However, if the shaft rotates in the presence of a fluid such as oil, conventional methods of mitigating electric voltage in dry environments may not provide sufficient protection.

SUMMARY

Systems and methods to mitigate electrical voltage on a rotating shaft by use of a grounding assembly or ring operating in an environment that is exposed to a viscous fluid (e.g., immersed, applied, contaminated, etc.) are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Systems and methods to mitigate electrical voltage on a rotating shaft in an oil environment exposed to a viscous fluid by use of a grounding ring assembly are disclosed. In particular, a grounding ring or assembly is disclosed that employs conductive filaments made of a stiffer fiber than conventional fibers. For example, the fibers may have a thicker diameter, be made of a stiffer material, and/or be prepared by a particular processing treatment (e.g., a composite of a plurality of smaller fibers bound together with a polymer matrix material, such as but not limited to nylon, polyester, vinylester, or epoxy, in a process such as but not limited to extrusion or pultrusion, etc.). Due to the difference in stiffness, strength, and/or surface characteristics of the fibers, and the desired attributes necessary to function as effective shaft grounding devices in an environment exposed to a viscous fluid, the fibers may be longer than conventional fibers (e.g., extend inward (radially or otherwise oriented) closer to the center of the grounding assembly). For instance, the fibers are arranged to make contact (e.g., overlap, interference fit, interact, etc.) with the rotating shaft (e.g., bend or flex to contact the shaft and/or align with a surface of the shaft during rotation) in a manner different than conventional fibers. In particular, the bending/flexing of the fibers due to the overlap results in a pressure on the fibers sufficient to cut through the viscous fluid (and/or withstand pressure from the viscous fluid during rotation) such that electrical conductivity is achieved (even in the presence of a film of viscous fluid between the fibers and the shaft and even at high shaft speeds and even at lower oil temperatures). In other words, the disclosed stiffer and/or longer fibers contact the rotating shaft in a unique way, which breaks through the film of viscous fluid yet allows each filament to bend without easily breaking or wearing prematurely. Thus, by penetrating the oil film without excessive contact pressure, the thickness of the layer of oil film remaining between the rotating shaft and the fibers is reduced to a level below a threshold thickness to allow charge mitigation or provide direct contact to rotating shaft for electric charge mitigation. Thus, the fibers provide adequate electrical discharge within an environment exposed to a viscous fluid (e.g., immersed, applied, contaminated, etc.) to mitigate electrical bearing damage and other equipment damage from shaft voltage, while providing suitable longevity. The threshold thickness may depend on the type of viscous fluid, the characteristics of the viscous fluid and/or the film produced by the viscous fluid during rotation of the shaft, shaft surface finish, shaft rpm, shaft size, and/or other electro-mechanical factors.

Induced shaft electrical voltage is experienced in a variety of applications, including electric motors, transmissions, etc. Some shaft grounding is implemented in dry environments with relatively small conductive filaments. Grounding is possible due to low impedance, even allowing for mitigation of electrical current without making contact with the rotating shaft.

By contrast, in an oil rich or oil immersed environment, the conventional conductive filaments may experience forces or currents provided by oil (e.g., a film, via currents in the moving oil, etc.) and thus may not make contact with the rotating shaft. Further, conventional conductive filaments may not be in electrical communication with shaft due to the presence of an oil film (e.g., due to increased distance, impendence, etc.), and the filaments may become damaged as they are bent beyond a certain threshold amount, and/or the orientation of the conventional conductive filaments can change periodically or randomly during rotation of the shaft due to pressure from the oil. For instance, pressure on the oil may create an oil film between the rotating shaft and the fibers, which then deflects the fibers to a distance that reduces the effectiveness of the fibers for electrical discharge of the rotating shaft.

The presence of a viscous fluid can coat fibers with the fluid, such that the fibers and/or bundles of fibers experience saturation, which may impact fiber contact and therefore grounding mitigation. Further, once saturated, in order for conventional fibers to return to full operational efficacy, the viscous fluid must fully or partially migrate out from the fiber bundles. Advantageously, the disclosed fibers are less susceptible to saturation (due to the physical characteristics, such as larger diameter and/or stiffer fibers, and/or arrangement of fibers in bundles and/or about the grounding ring), and, if a level of saturation is achieved, viscous fluid migrates from the disclosed fibers more readily than conventional fibers.

Induced Shaft electrical voltage is experienced in electric motors, and commonly in three-phase motors driven by variable speed drives. Variable speed drives utilize pulse width modulation (PWM) technology to vary the speed of AC motors. A drawback to the use of AC motors with variable speed drives is that common mode voltage (CMV) is generated by the variable speed drive, which, in the absence of adequate voltage mitigation, increases damaging bearing currents. Although some examples are disclosed with respect to AC and/or rotating shafts, the disclosed grounding assembly can be applied to a variety of systems that may experience a non-zero voltage difference across a bearing. For example, a non-zero voltage difference can be created across linear bearings, gear boxes, and/or other motors, such as a brushless DC motor, can also experience shaft voltage similarly based on the switching currents to the motor windings, which can be effectively mitigated by employing the disclosed grounding assembly.

In an example of a rotating motor shaft, voltage on the motor shaft causes parasitic or otherwise unwanted current to flow through the shaft bearings to the motor frame and then to ground. Over a short period of time, CMV causes electrical charges to build to a high level. As the electrical charges pass the discharge threshold of the least electrically resistive path, sometimes through rolling elements (e.g., ball, needle, fluid, Babbitt, etc.) in the bearings supporting the shaft, an instantaneous burst or discharge of electrical energy passes along the path. For example, electrical or current leakage erosion can cause damage to contact surfaces in response to the passage of electric current that exceeds a threshold limit (e.g., voltage, current, etc.). The discharge can cause electric discharge machining (EDM) along the path, which can damage the surfaces of the bearing races and the rolling elements in the bearing if the lowest impedance path is through the bearings. The electrical energy burst creates fusion craters, and particulate from the crater formation remains inside bearing. Both the fusion crater and the particulate material in the bearing act to disturb the free rotation of the bearing, which can lead to mechanical damage and premature bearing failure. While some disclosed examples are described with reference to motor shafts, the conductive filaments may also be used to make electrical contact with any application that experiences parasitic voltage buildup within a rotating shaft assembly.

A number of mitigation technologies have been used in attempts to overcome this problem. Conventional techniques include using conductive bearing grease, insulating the bearings, and using copper/phosphorus brushes and a Faraday shield. Another conventional technique is to ground the shaft using spring-loaded solid brushes (e.g., copper, silver graphite,—etc.) that provide a continuous flow of current to ground. However, spring loaded brushes can wear out rapidly, requiring frequent, periodic service and replacement and don't conduct high frequencies very well. Spring-loaded brushes also tend to vibrate due to alternating frictional relationships between the brush and the shaft surface. Vibration of the brushes, from whatever cause, can result in undesirable sparking and/or increased current flow through bearings and/or downstream equipment due to reduced surface contact. Further, many of these technologies cannot operate when exposed to significant viscous fluid or oil intrusion, often having very low maximum speed restrictions, or failing to function at all.

Other conventional methods include using mercury rotary couplings which, in addition to containing mercury, corrode at the contacts in the presence of high current and/or rapidly changing voltages, which leads to conductivity degradation over time and/or, in extreme cases, release of mercury. Mercury rotary couplings also require expensive and potentially unreliable seal mechanisms and require a narrow range of usable temperatures and low maximum service speeds.

If a viscous fluid or oil is used, as a lubricant for example, conventional methods of mitigating electric current using dry brushes may not provide sufficient protection, as their high surface area to contact pressure ratio causes the dry brushes to ride on a boundary layer of oil too thick for shaft voltage mitigation. Accordingly, disclosed systems and methods of example grounding brush assembly mitigate electric current in a rotating shaft in the presence of a viscous medium, such as an oil lubricant, cooling fluid, or solvents. The grounding brush assembly includes a plurality of conductive filaments configured to extend through the viscous medium surrounding the rotating shaft to be in electrical contact with the rotating shaft when the brush assembly is disposed proximate the shaft.

In some examples, rotating shafts are subject to corrosion and rust, and may be treated with oils, lubricants, or other treatments. In some examples, rotating shafts may be working in cooperation with other mechanical components, which may subject the rotating shaft to a variety of fluids, such as coolants, water, gases, particulates, etc. The presence of such lubricants, coolants, and/or other media may interrupt the operation of conventional shaft grounding devices. During rotation of a shaft, such oils may be distributed and/or displaced by contact with fibers. The displacement of the oil may decrease the amount of oil below a threshold level, such that the amount of oil is insufficient to provide the desired lubrication and/or anti-corrosive benefits. By employing a ring (e.g., grounding or non-grounding) having fibers constructed and/or arranged as disclose herein, the amount of oil can be maintained a desired level (e.g., above a threshold level) to ensure a lubricating film remains on the shaft during operation. Thus, properties of the fibers (e.g., length, diameter, stiffness, surface area geometry, density, composite action, arrangement on the ring, etc.) can be adjusted to tune and/or optimize oil distribution to achieve a desired outcome (e.g., a particular threshold level of oil).

Advantageously, by employing the disclosed grounding ring, a rotating shaft can be arranged in environments that would otherwise have been impractical due to the possibility a fluid or other media would contact the shaft, disrupting the pathway to ground. By the disclosed grounding ring, contact with a surface of a rotating shaft contaminated with oil or other media is enhanced, allowing for an expanded variety of use cases.

In disclosed examples, a grounding brush assembly is configured to mitigate electric current in a rotating shaft in the presence of a viscous medium or fluid, the grounding brush assembly comprising a plurality of conductive filaments configured to extend through a viscous medium surrounding the rotating shaft to be in electrical contact with the rotating shaft when the brush assembly is disposed proximate the shaft.

In some examples, the viscous medium is a fluid such as an oil. In some examples, the viscous medium is configured to be distributed about the shaft by force applied through contact with at least a portion of the conductive filaments during rotation of the shaft.

In some disclosed examples, a grounding brush assembly is configured to mitigate electric current in a rotating shaft in the presence of an oil. The grounding brush assembly includes a first plurality of conductive filaments having a first stiffness, and a second plurality of conductive filaments having a second stiffness, wherein one or more conductive filaments is configured to extend through the oil to be in electrical continuity with the rotating shaft when the brush assembly is disposed proximate the shaft.

In some examples, the first plurality of conductive filaments has a first diameter or a first length, and the second plurality of conductive filaments has a second diameter or a second length. In examples, the brush assembly is configured to be mounted on the shaft, and the first or second plurality of conductive filaments are configured to extend from an interior diameter of the assembly radially inward toward the shaft. In examples, the first and second plurality of conductive filaments are equally distributed about the inner diameter. In examples, the first plurality of conductive filaments is distributed about the inner diameter with a first distribution pattern, and the second plurality of conductive filaments is distributed about the inner diameter with a first distribution pattern. In examples, second plurality distributed about the inner diameter with a second density In some examples, the oil creates a film between the shaft and one or more of the first or second plurality of conductive filaments. In examples, the oil is configured to be displaced about the shaft by force applied through contact with at least a portion of the first plurality of conductive filaments and the second plurality of conductive filaments during rotation of the shaft. In examples, contact between the first plurality of conductive filaments and the oil results in a first force against the oil, and contact between the second plurality of conductive filaments and the oil results in a second force against the oil during rotation of the shaft.

In some examples, one or more of the first plurality of conductive filaments or the second plurality of conductive filaments comprises a composite fiber. In examples, the first or second plurality of conductive filaments comprise at least one of carbon fiber, nickel, stainless steel, a woven fiber, or a conductive plastic.

In some examples, the first or second plurality of conductive filaments are configured to be in electrical contact with the shaft by at least one of direct contact with the shaft, via a shaft collar, via a shaft extension, via a shaft stub, or via a gearbox.

In some examples, the grounding brush assembly is configured to be coupled to an electrical ground to provide an electrical path between the shaft and the electrical ground.

In some disclosed examples, a brush assembly is configured to distribute a fluid lubricant about a rotating shaft, wherein the brush assembly comprising a plurality of filaments configured to contact the rotating shaft when the brush assembly is disposed proximate the shaft to generate a pressure in the fluid lubricant to distribute the fluid lubricant about the rotating shaft in a film having a threshold thickness.

Figure 1:
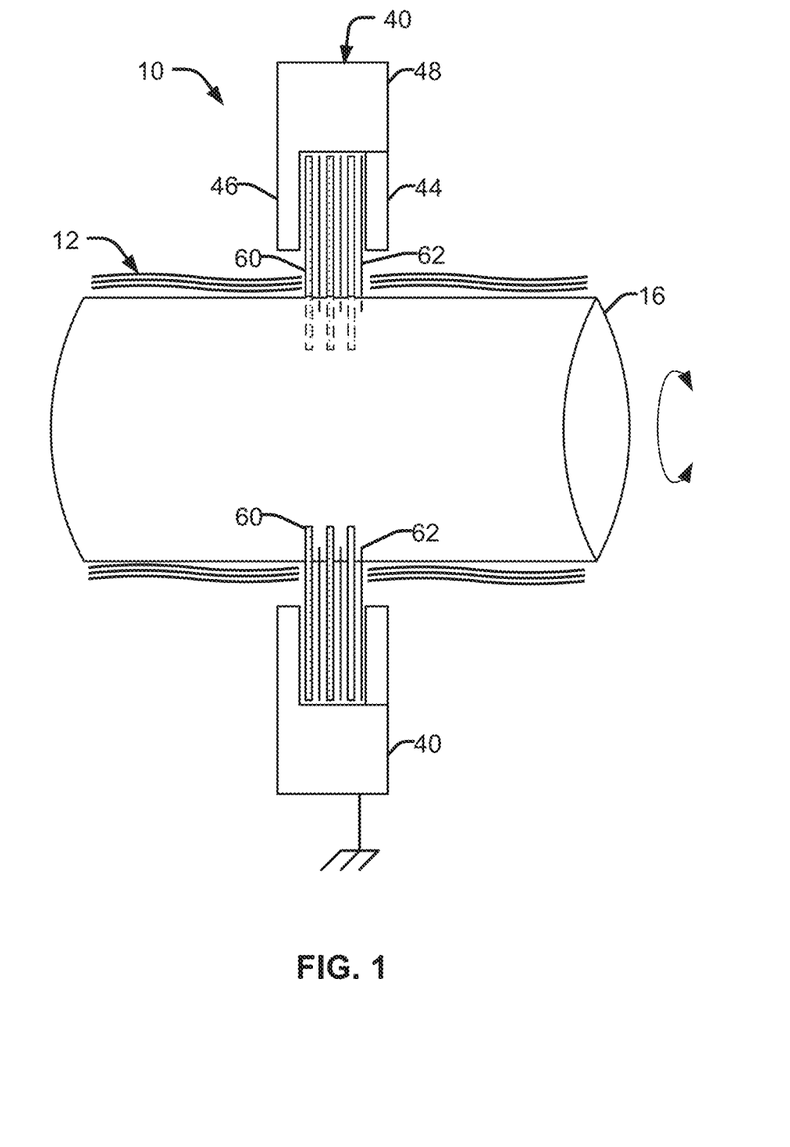
FIG. 1 is an example grounding brush assembly about a shaft, in accordance with aspects of the present disclosure.

Referring now more specifically to the drawings and to FIG. 1 in particular, a grounding brush assembly 10 is installed on a shaft 16 (e.g., of a motor 12) in the presence of a viscous medium or fluid 12, such as an oil lubricant, grease, water, particulate contaminants, and/or gases, as a list of non-limiting examples. The example grounding brush assembly 10 dissipates electrical charges that may build up on the shaft 16. The grounding brush assembly 10 can be provided in a variety of different sizes for use on shafts 16 of different diameters. The grounding brush assembly 10 can be used on a variety of rotating shafts, including motors, turbines, conveyors and other assemblies and constructions that may build up an electrical charge.

The brush ring assembly 10 generally surrounds the shaft 16 and is operatively arranged for the one or more conductive filaments (e.g., a first plurality of conductive filaments 60 and/or a second plurality of conductive filaments 62) to dissipate, directly or indirectly through the ground, static charges, common mode voltage, and/or other charges that build on the shaft 16 during operation (e.g., of a motor, a turbine, a gear, etc.).

In disclosed examples, the shaft 16 rotates in the presence of an oil or other viscous fluid or medium. Conventional conductive filaments may not make contact with the shaft due to the presence of the oil. For instance, the oil may create a barrier between the filaments and the shaft, creating pressure during rotation which forces filaments to deform such that contact with the shaft is broken. Further, the presence of the oil may increase impedance, further limiting electrical continuity between the shaft and the filaments.

The first plurality of filaments 60 are designed to have a greater diameter than other filament fibers. Additionally or alternatively, the filament may be longer, and/or have a greater material stiffness (e.g., more rigid material) than other filament fibers.

In some examples, the first plurality of conductive filaments 60 are distributed within the channel between outer and inner segments 44 and 46 to mix with the second plurality of conductive filaments 62. For example, the second plurality of filaments 62 may have different dimensions from the first plurality of filaments, such as a smaller or larger diameter, be shorter or longer, and/or more or less flexible than the first plurality of filaments 60. The space created between the first and second filaments creates a pathway for oil to flow, thereby avoiding buildup of a film of oil between the shaft and the filaments. By avoiding oil buildup, one or more of the first or second filaments is able to contact the shaft to dissipate charge buildup thereon. Thus, by penetrating the oil film, the thickness of the layer of oil film remaining between the rotating shaft and the fibers is reduced to a level below a threshold thickness to allow electric charge mitigation. Thus, the fibers provide adequate electrical discharge within an environment exposed to an oil or other viscous fluid (e.g., immersed, applied, contaminated, etc.), while providing suitable longevity. The threshold thickness may depend on the type of oil and the characteristics of the oil and/or the film produced by the oil during rotation of the shaft. In some examples, the first plurality of filaments 60 has a material type different from the second plurality of filaments 62. In some examples, the first and second plurality of filaments are of the same material type. In some examples, one or more bundles of the filaments (e.g., the first and/or second plurality of filaments) may include a variety of material types.

In some examples, the conductive filaments are coated in an epoxy or otherwise treated to improve stiffness and/or displace and/or distribute the viscous fluid as the shaft rotates. Further, due to the interaction of fibers with different adjacent fibers or fiber bundles by full or partial composite action within the viscous fluid environment, any individual or bundle of fibers is less likely to become stuck and/or deform beyond a threshold level. The partial composite action between the fibers will also work to increase stiffness to aide in penetrating the film of viscous fluid. In some examples, one or more of the plurality of filaments (e.g., within each bundle and/or between bundles) may be bonded, such that a greater degree of composite action is achieved between fibers (up to and including full composite action), which may further stiffen the bonded fiber(s).

In some examples, the first plurality of conductive filaments 60 is able to deform in a desirable manner, such as within a threshold amount of deformation, based on an angle of bending, a strain or force experienced by the fibers or a portion thereof, may be optimized based on a variety of factors, including properties of the fibers (e.g., diameter, length, material type, material strength, treatment process, etc.) and/or properties of the environment (e.g., temperature, distance between the assembly 10 and a surface of the shaft 16, fluid viscosity, impedance, etc.). This tuning serves to optimize contact pressure such that the fibers experience minimal wear while providing adequate shaft voltage mitigation. The conductive filaments 60, 62 are configured to bend or flex to follow the surface of the rotating shaft regardless of rotation direction. As shown in FIG. 1, the shaft 16 is rotating. When rotating in a clockwise fashion, such that the filaments contacting the shaft at the top of the image bend away from the viewer, and the filaments contacting the shaft at the bottom bend toward the viewer. In some examples, the shaft is configured to rotate in clockwise as well as counter-clockwise direction, which may or may not cause the filaments to reverse their bent. Thus, operation and benefits of the disclosed assemblies are applicable for shafts rotating in a single direction or reversing directions.

FIG. 1 illustrates a mix of different fibers, such that the first plurality of conductive filaments 60 has a greater length and diameter than the second plurality of conductive filaments 62. In some examples, a longer, thicker fiber alone may be used, and one or more of a variety of distribution patterns may be employed to optimize contact with the shaft 16 and/or displacement of the viscous fluid or oil during rotation of the shaft 16. It should be understood that the number of fibers may in some embodiments be much greater than shown, and the proximity much closer, with the drawing showing a greater spacing and smaller number of fibers for visual clarity. As shown in FIG. 1, the first and second plurality of conductive filaments 60, 62 are arranged to contact a surface of the shaft 16 during rotation. As disclosed herein, the filaments have a length and a strength that biases the ends of the filaments against the shaft 16 with a force sufficient to extend through the media 12.

In some examples, properties of the fibers are optimized based on material stiffness, diameter of fiber and exposed length of fiber, as well as the resulting overlap of the fibers with the shaft 16 at a suitable contact pressure. In some examples, the diameter of fibers or bundles of fibers are provided as bundles of 0.0011 inches (e.g., greater than other diameters of 0.0003 inches). However, some applications may employ a smaller or greater diameter (e.g., for individual fibers or bundles thereof).

Figure 1A:
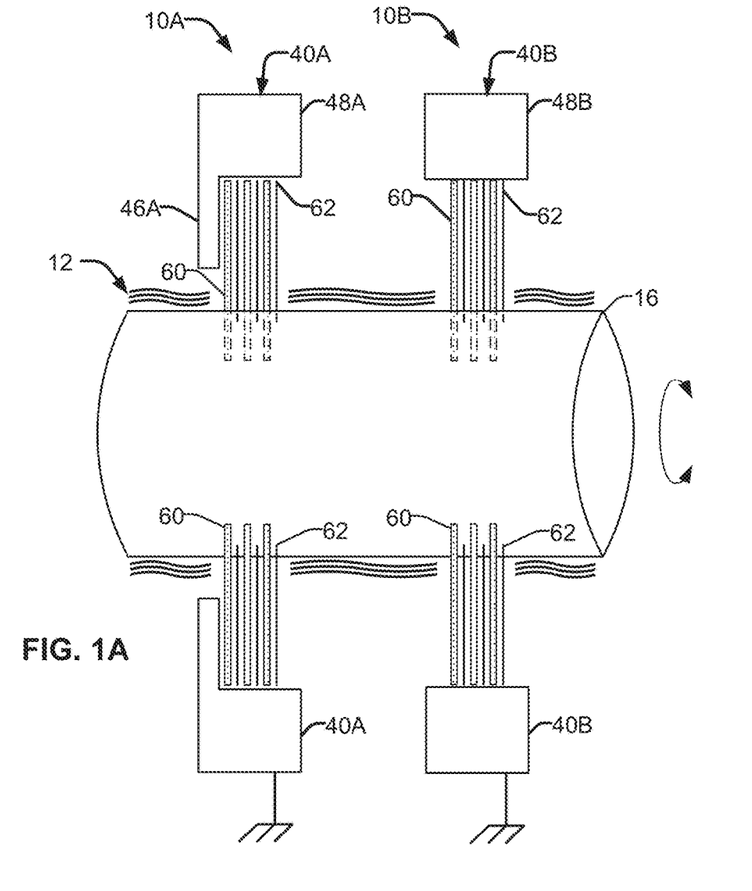
FIG. 1A illustrates alternative example grounding brush assemblies about a shaft, in accordance with aspects of the present disclosure.

FIG. 1A illustrates two alternative example grounding brush assemblies 10A and 10B arranged about the shaft 16, in accordance with aspects of the present disclosure. Similar or identical reference numbers in FIG. 1A are used to refer to similar or identical components, denoted with an "A" or a "B" to distinguish between alternative components.

In particular, example grounding brush assembly 10A provides a single lateral segment 46A, exposing the first and second plurality of conductive fibers 60, 62 on the opposite side. Example grounding brush assembly 10B illustrates the first and second plurality of conductive fibers 60, 62 extending from a surface of an inner diameter of the body 40B without any inner or outer lateral segment.

Figure 1B:
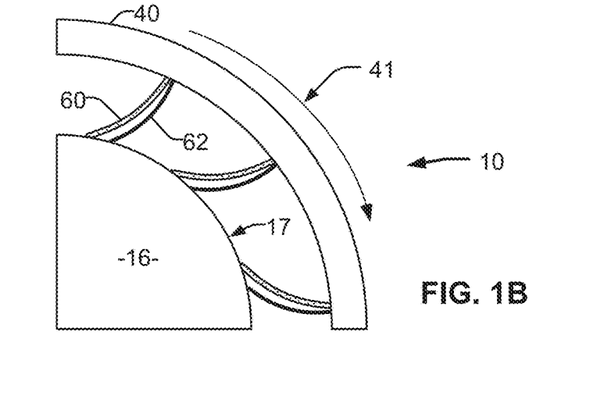
FIG. 1B illustrates alternative example grounding brush assemblies about a shaft, in accordance with aspects of the present disclosure.

FIG. 1B illustrates a side-view of an example grounding brush assemblies 10 arranged about the shaft 16. As shown, the plurality of filaments 60, 62 are deformed or bent as the ends of the filaments contact surface 17 of the shaft 16. In the example of FIG. 1B, filaments 60 have a greater length than filaments 62, such that the amount of deformation is greater for filaments 60 in comparison to filaments 62.

As shown in the examples of FIG. 2A-2E, the first and second plurality of conductive fibers 60, 62 may be distributed within a channel defined by an inner diameter formed between outer and inner segments 44 and 46. The resulting separation between fibers may provide an advantage by providing space to move viscous fluid within the environment away from the fiber to shaft interface. Although described as being within a channel in some examples, in some examples the filaments 60, 62 are secured to the body 48 without outer or inner segments, and may be fixed to a lateral surface of the body, extend through the body 48, or be secured by another suitable technique (as shown in the non-limiting examples of FIG. 1A and FIG. 4). Additionally or alternatively, the fibers may be oriented substantially radially inward in some examples, may be oriented at one or more angles other than substantially toward center, may be a mix of fibers or bundles of fibers having two or more orientations, and may be continuous or non-continuous, depending on a particular application or desired outcome. In some examples, a continuous fiber forms a loop such that both ends of the fiber are secured to body, with the middle of the fiber flexed into contact with the shaft. A continuous fiber may provide longer wear life over a non-continuous fiber, which is secured to the body at one end and contacts the shaft at the opposite end.

Figure 2A:
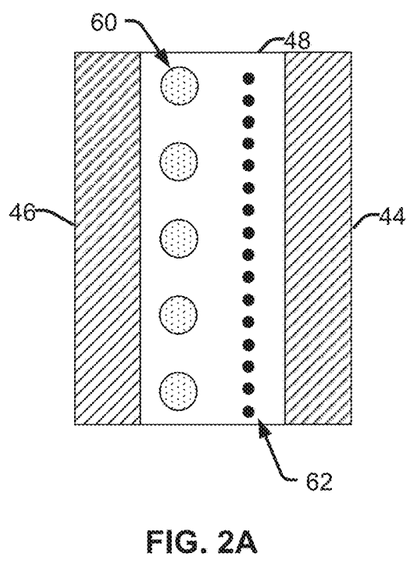
FIG. 2A-2E illustrates example filament patterns in a grounding brush assembly in accordance with aspects of the present disclosure.
Figure 2B:
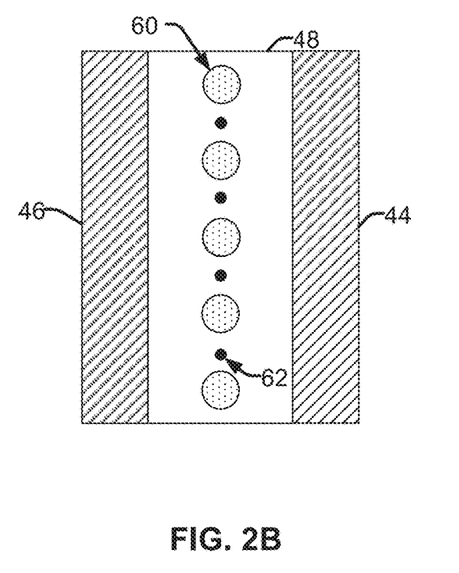
Figure 2C:
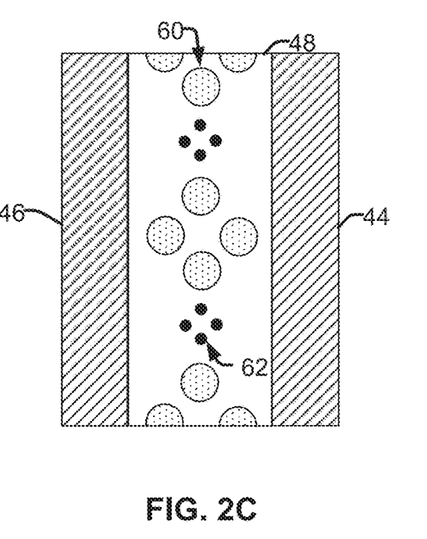
Figure 2D:
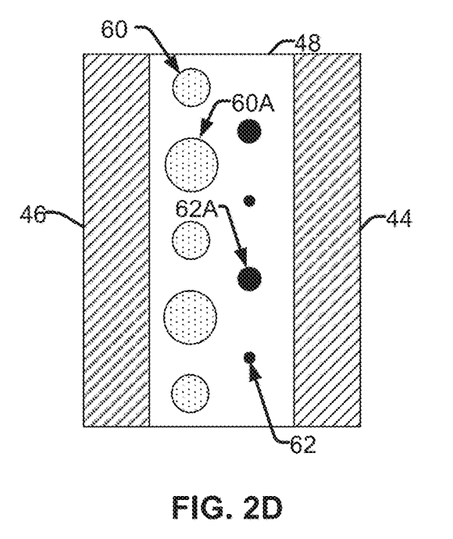

In the example of FIG. 2A, a row of each of the first and second plurality of conductive filaments 60 and 62 are arranged side-by-side, spanning the inner diameter of the body 40. In the example of FIG. 2B, a single row is provided with alternating fibers from the first and the second plurality of conductive filaments 60 and 62 within the channel. In the example of FIG. 2C, a row includes alternating bundles each of the first and second plurality of conductive filaments 60 and 62. In the example of FIG. 2D, conductive fibers of the first and second plurality of conductive filaments 60 and 62 may be varied. As shown, the first plurality of conductive filaments 60 may include a larger diameter fiber 60A, which may be arranged in a pattern with fibers 60. Similarly, the second plurality of conductive filaments 62 may include a larger diameter fiber 62A, which may be arranged in a pattern with fibers 62. The second plurality of conductive filaments 62 may include a larger diameter fiber 62A, which may be arranged in a pattern with fibers 62.

Figure 2E:
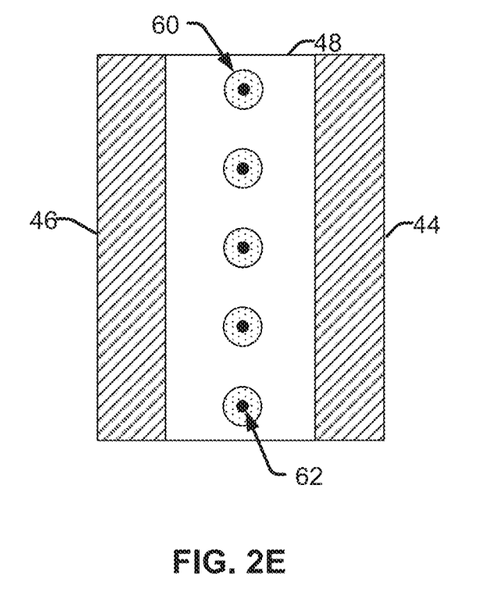

In the example of FIG. 2E, conductive fibers of the first plurality of conductive filaments 60 are arranged to surround the second plurality of conductive filaments 62. In some examples, the first plurality of conductive filaments 60 may be adjacent to and/or arranged in close proximity to the second plurality of conductive filaments 62 arranged in the center of the resulting bundle of fibers. For instance, the second plurality of conductive filaments 62 may be pultruded or otherwise have a greater stiffness than the first plurality of conductive filaments 60. The arrangement illustrated in FIG. 2E therefore provides added strength to the first plurality of conductive filaments 62 during rotation of the shaft 16. In some examples, the first plurality of conductive filaments 60 are larger diameter than the second plurality of conductive filaments 62, but benefit from the stiffness that the partial composite action between fibers provides, thereby imparting the pressure needed to extend through the film of viscous fluid and make electrical contact with the shaft 16.

Although generally illustrated as evenly spaced apart, the distance between individual fibers, and/or bundles of fibers, can be adjusted, as well as a distance between inner walls of the outer and inner segments 44 and 46 (and/or a lateral surface of the body 48 in the absence of outer or inner segments) and individual fibers and/or bundles of fibers.

Furthermore, although the conductive filaments are illustrated as having a generally round shape, other geometries are contemplated, including substantially flat, rectangular, triangular, oval, as a non-limiting list of examples. The shape and/or dimensions may be selected to initiate a particular flow pattern for the viscous fluid (e.g., between individual fibers and/or bundles of fibers), as well to deform in a particular way in the presence of the viscous fluid oil to encourage contact with the shaft during rotation.

Figure 2F:
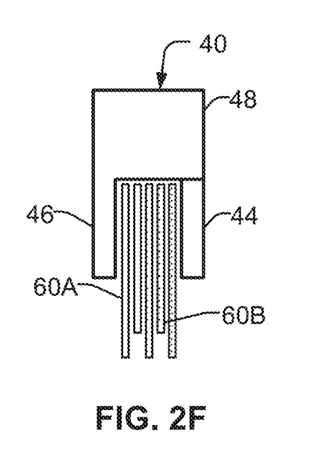
FIG. 2F and 2G illustrates example filament patterns in a grounding brush assembly in accordance with aspects of the present disclosure.
Figure 2G:
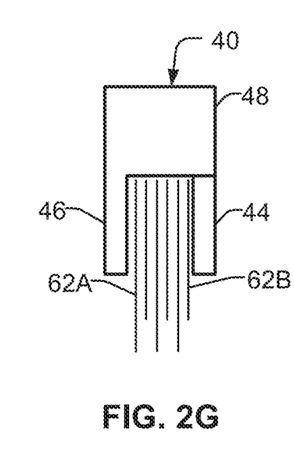

In some examples shown in FIGS. 2F and 2G, a brush ring assembly may have a single type of filament in one or more arrangements (e.g., as shown in FIGS. 2A-2E). For example, FIG. 2F illustrates filaments (e.g., bundles of filaments) 60A have a greater length in comparison to filaments 60B, both of which contain a common material. In the example of FIG. 2G, filaments 62A have a greater length in comparison to filaments 62B, both of which contain a common material. Other variations in addition to or in the alternative of length can include filament diameter, bundle arrangement, distribution around the annular body 40, as a list of non-limiting examples. Furthermore, although illustrated as having filaments with multiple lengths, in some examples some or all of the filaments (e.g., filaments 60) have a single length.

Figure 3:
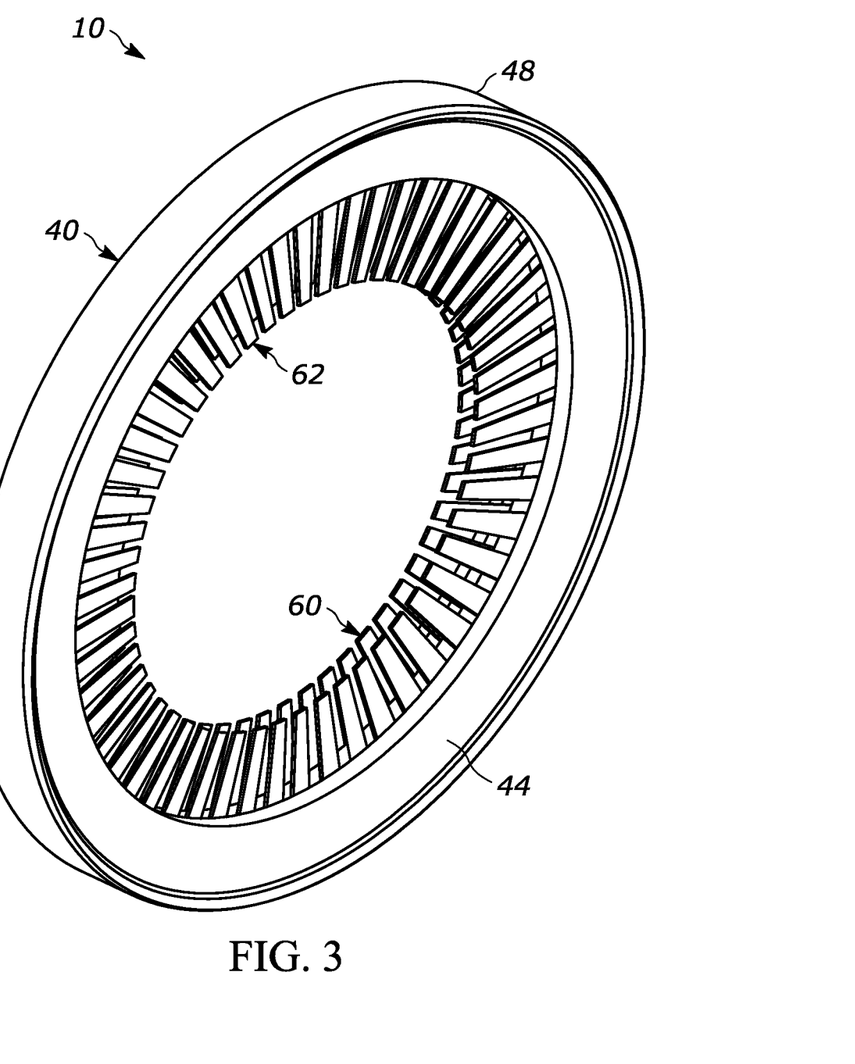
FIG. 3 is a perspective view of the grounding brush assembly of FIG. 1, in accordance with aspects of the present disclosure.

As illustrated in FIG. 3, the example brush ring assembly 10 is defined by an annular body 40 with the plurality of conductive filaments 60, 62 comprising a brush assembly 10 disposed within the annular body 40. The annular body 40 includes an outer segment 44, an inner segment 46 and a base 48. Together, the outer segment 44, the inner segment 46, and the base 48 form an annular channel in which the brush assembly 10 is disposed. The example annular body 40 is made of conductive materials, such as metals including, but not limited to aluminum, stainless steel, bronze and/or copper, and/or conductive plastics.

The example brush assembly 10 includes a plurality of individual fiber-like conductive filaments (e.g., a first plurality of conductive filaments 60 and/or a second plurality of conductive filaments 62) that may be arranged individually in a substantially continuous annular ring, and/or in a plurality of filament bundles arranged circumferentially around the shaft 16. In some examples, each filament is a fine, hair-like filament made from carbon fibers, nickel, stainless steel, conductive plastics, or any other conductive fiber-type filament, including hybrid and composites thereof such as nickel coated carbon fibers, or copper coated steel fibers.

In some such examples, one or more of the first plurality of conductive filaments or the second plurality of conductive filaments 62 may have diameters less than about 150 microns. The conductive filaments may have diameters within a range of about 5 microns to about 100 microns. Alternatively, the conductive filaments 60, 62 can be larger fibers of conductive material that are held in contact with the shaft 16. In some examples, the conductive filaments are integral with the annular body 40, such as by additive manufacturing.

The example conductive filaments are secured within body 40 by one or more techniques, such as an anchor structure, that is electrically conductive and may be in the form of clamping structure such as plates between which conductive filaments are held. Alternatively, the conductive filaments can be secured by a conductive body of filler material such as conductive plastic, conductive adhesive, nonconductive noncontinuous adhesive, or the like, anchoring the conductive filaments in the body 40. Portions of distal ends of the conductive filaments can extend past the outer and inner segments 44, 46 inwardly (e.g., substantially but not necessarily directly radially inwardly oriented relative to the grounding brush assembly 10) toward the shaft 16. The thin, lightweight conductive filaments physically contact the shaft 16 for direct transfer of electrical charge from the shaft 16 without significant wear during operation.

In some examples, the conductive filaments 60, 62 completely encircle the shaft 16 and channel shaft voltages to ground. In some examples, the conductive filaments 60, 62 gradually wear to fit the shaft 16. When the conductive filaments 60, 62 have worn to fit the shaft 16, the conductive filaments 60, 62 wear rate decreases substantially, and the conductive filaments maintain electrical contact with the motor shaft 16.

Transfer of charge from the shaft 16 to the conductive filaments 60, 62 occurs directly by touching contact of the conductive filaments 60, 62 against the shaft 16. The electrical charge can transfer from the conductive filaments 60, 62 through the body 40 and the ground connection (e.g., via a path to chassis ground, earth ground, reference voltage, etc.). Thus, charge that builds on the shaft 16 is dissipated to ground through grounding brush assembly 10 before arcing can occur. As used herein, the term "grounding" refers to any circuit path which allows the grounding device to effect a reduction in the voltage difference between the shaft 16 and one or more of bearings and/or downstream equipment such as gears, bearings, or the like.

The example conductive filaments 60, 62 protect motor bearings that are in electrical continuity with the shaft 16 from electrical damage for the full L-10 life of such bearings. For example, the conductive filaments may be sufficiently numerous to protect any bearings that are in electrical continuity with the shaft 16 from failure due to excess current erosion, as defined in ISO 15243:2017 Section 5.4.2, and/or from failure due to current leakage erosion, as defined in ISO 15243:2017 Section 5.4.3, for at least the L-10 life of the bearings. In other words, the example conductive filaments 60, 62 may substantially eliminate excess current and/or current leakage erosion as causes of bearing failure. The L-10 life of a bearing refers to the number of hours of service that 90% of the instances of that type of bearing will survive and varies by application.

While disclosed examples are described above with reference to motor shafts, the conductive filaments may also be used to make electrical contact within a slip ring for current transfer.

Figure 4:
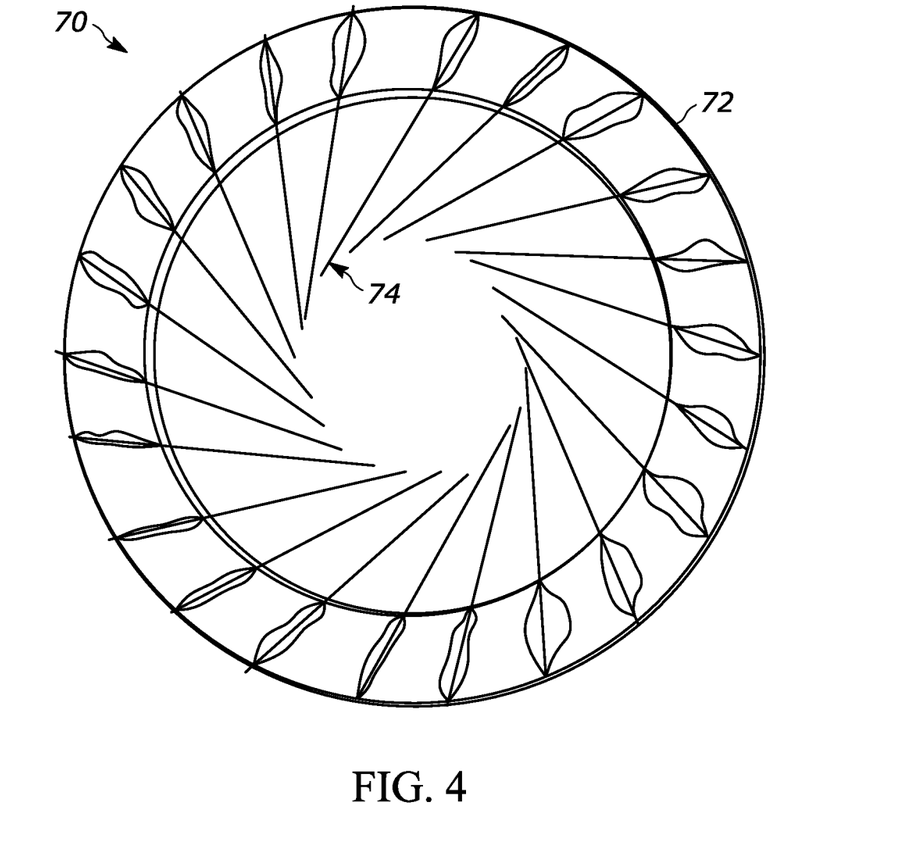
FIG. 4 illustrates another example brush ring assembly defined by an annular body, in accordance with aspects of the present disclosure.

FIG. 4 illustrates another example brush ring assembly 70 defined by an annular body 72 with a plurality of conductive filaments 70 disposed within the annular body 40. Although illustrated with substantially singular fibers, some example brush ring assemblies 70 may include multiple conductive filaments and/or filament types (e.g., conductive filaments 60, 62), additional to or in the alternative of conductive filaments 70. In some examples, the annular body 72 includes an outer segment, an inner segment and a base similar to assembly 10, which form an annular channel in which the conductive filaments form a brush.

As shown, the conductive filaments of example brush assembly 70 includes may be arranged individually in a substantially continuous annular ring, and/or in a plurality of filament bundles arranged circumferentially around a shaft. In some examples, each filament is oriented toward the interior of the body 72, yet at an angle offset from a radius. The angled fibers 74 may overlap with the shaft on a more flat portion of a distal end of the fiber, such that the forces and thus bending experienced by each fiber 74 is less (e.g., in comparison to a radially oriented fiber). Thus, the conductive filaments 74 may experience less wear by being tuned to the correct contact pressure by geometric stiffness, without needing precise different fiber bundle diameters for different applications.

The example conductive filaments are secured within body 40 by one or more techniques, such as those described with respect to assembly 10. Advantageously, in the event the shaft rotation is reversed, the angle at which the fibers 74 contact the shaft does not change substantially.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A grounding brush assembly to mitigate electric current in a rotating shaft in the presence of a viscous medium, the grounding brush assembly comprising a first conductive filament having a first length and a second conductive filament having a second length, the first and second conductive filaments extending in a common direction radially inward toward the rotating shaft, wherein the first and second conductive filaments are configured to extend through the viscous medium surrounding the rotating shaft to be in physical and electrical contact with the rotating shaft when the brush assembly is disposed proximate the rotating shaft.

2. The grounding brush assembly as defined in claim 1, wherein the viscous medium comprises an oil.

3. The grounding brush assembly as defined in claim 1, wherein the viscous medium is configured to be distributed about the shaft by force applied through contact with at least a portion of the first or second conductive filaments during rotation of the rotating shaft.

4. The grounding brush assembly as defined in claim 1, wherein the first conductive filament has first length greater than a second length of the second conductive filament.

5. The grounding brush assembly as defined in claim 1, further comprising a body having an inner diameter, wherein the first and second plurality of conductive fibers extend from the inner diameter towards a surface of the rotating shaft.

6. A grounding brush assembly to mitigate electric current in a rotating shaft in the presence of an oil, the grounding brush assembly comprising:
a first plurality of conductive filaments having a first length and a first stiffness; and
a second plurality of conductive filaments having a second length and a second stiffness, wherein the first and second plurality of conductive filaments are configured to extend in a common direction radially inward toward the rotating shaft through the oil to be in physical contact and electrical continuity with the rotating shaft when the brush assembly is disposed proximate the rotating shaft.

7. The grounding brush assembly as defined in claim 6, wherein the first plurality of conductive filaments has a first diameter or a first length, and the second plurality of conductive filaments has a second diameter or a second length.

8. The grounding brush assembly as defined in claim 6, wherein the brush assembly is configured to be mounted on the shaft, and the first or second plurality of conductive filaments are configured to extend from an interior diameter of the assembly radially inward toward the rotating shaft.

9. The grounding brush assembly as defined in claim 8, wherein the first and second plurality of conductive filaments are equally distributed about the inner diameter.

10. The grounding brush assembly as defined in claim 8, wherein the first plurality of conductive filaments is distributed about the inner diameter with a first distribution pattern, and the second plurality of conductive filaments is distributed about the inner diameter with a second distribution pattern different from the first distribution pattern.

11. The grounding brush assembly as defined in claim 8, wherein the first plurality of conductive filaments are distributed about the inner diameter with a first density, and the second plurality of conductive filaments are distributed about the inner diameter with a second density.

12. The grounding brush assembly as defined in claim 6, wherein the oil creates a film between the shaft and one or more of the first or second plurality of conductive filaments.

13. The grounding brush assembly as defined in claim 6, wherein the oil is configured to be displaced about the shaft by force applied through contact with at least a portion of the first plurality of conductive filaments and the second plurality of conductive filaments during rotation of the shaft.

14. The grounding brush assembly as defined in claim 13, wherein contact between the first plurality of conductive filaments and the oil results in a first force against the oil, and contact between the second plurality of conductive filaments and the oil results in a second force against the oil during rotation of the shaft.

15. The grounding brush assembly as defined in claim 6, wherein one or more of the first plurality of conductive filaments or the second plurality of conductive filaments comprises a composite fiber.

16. The grounding brush assembly as defined in claim 6, wherein the first or second plurality of conductive filaments comprise at least one of carbon fiber, nickel, stainless steel, a woven fiber, or a conductive plastic.

17. The grounding brush assembly as defined in claim 6, wherein the first or second plurality of conductive filaments are configured to be in electrical contact with the shaft by at least one of direct contact with the shaft, via a shaft collar, via a shaft extension, via a shaft stub, or via a gearbox.

18. The grounding brush assembly as defined in claim 6, further configured to be coupled to an electrical ground to provide an electrical path between the shaft and the electrical ground.

19. A brush assembly to distribute a fluid lubricant about a rotating shaft, wherein the brush assembly comprises:

a body having an inner channel;

a first plurality of filaments having a first length distributed along a first radial position within the channel; and a second plurality of filaments having a second length distributed along a second radial position within the channel, wherein the first and second plurality of filaments are configured to extend in a common direction radially inward toward the rotating shaft and to physically contact and maintain electrical continuity with the rotating shaft when the brush assembly is disposed proximate the rotating shaft to generate a pressure in the fluid lubricant to distribute the fluid lubricant about the rotating shaft in a film having a threshold thickness.

20. The brush assembly as defined in claim 19, wherein the inner channel defined by an inner diameter, wherein the first and second plurality of filaments extend from the inner diameter towards a surface of the rotating shaft, the first plurality of filaments being distributed within the channel in a first pattern, and the second plurality of filaments being distributed within the channel in a second pattern.

* * * * *